(12) United States Patent
Novich et al.

(10) Patent No.: US 10,699,538 B2
(45) Date of Patent: Jun. 30, 2020

(54) METHOD AND SYSTEM FOR DETERMINING AND PROVIDING SENSORY EXPERIENCES

(71) Applicant: NeoSensory, Inc., Palo Alto, CA (US)

(72) Inventors: Scott D. Novich, Palo Alto, CA (US); David M. Eagleman, Palo Alto, CA (US)

(73) Assignee: NeoSensory, Inc., Houston, TX (US)

(*) Notice: Subject to any disclaimer, the term of this patent is extended or adjusted under 35 U.S.C. 154(b) by 0 days.

(21) Appl. No.: 15/661,934

(22) Filed: Jul. 27, 2017

(65) Prior Publication Data
US 2018/0033263 A1   Feb. 1, 2018

Related U.S. Application Data

(60) Provisional application No. 62/367,475, filed on Jul. 27, 2016.

(51) Int. Cl.
G08B 6/00     (2006.01)
G06F 3/01     (2006.01)
(Continued)

(52) U.S. Cl.
CPC ............... *G08B 6/00* (2013.01); *G06F 3/016* (2013.01); *G10H 1/045* (2013.01); *G10H 3/26* (2013.01);
(Continued)

(58) Field of Classification Search
CPC .......... A61F 11/04; G06F 3/011; G06F 3/016; G06F 3/0487; G06F 3/04883; G06F 3/16;
(Continued)

(56) References Cited

U.S. PATENT DOCUMENTS 3,342,923 A * 9/1967 Henley ................. G10H 1/0091
 84/672
4,665,494 A * 5/1987 Tanaka ..................... G01H 3/08
 324/76.19
(Continued)

FOREIGN PATENT DOCUMENTS

WO    106698    9/2008
WO    069429    5/2012

OTHER PUBLICATIONS

Plant, Geoff, "Training in the use of the Tactaid VII: A case study", KTH Computer Science and Communication (STL-QPSR), 1994, vol. 35, No. 1, pp. 091-102.
(Continued)

*Primary Examiner* — Stephen R Burgdorf
(74) *Attorney, Agent, or Firm* — Jeffrey Schox; Caitlin Ploch

(57) ABSTRACT

A method including: receiving a music input; determining values of musical parameters based on the input; generating a spatial representation of the music input based on the values; and at a plurality of haptic actuators defining a spatial distribution, cooperatively producing a haptic output based on the spatial representation. A method including: mechanically coupling haptic actuators defining a multidimensional array to a user; receiving a music input; generating a spatial representation of the music input defined on a multidimensional space, wherein the multidimensional space and the multidimensional array have equal dimensionality; and, for each haptic actuator: based on the haptic actuator location within the multidimensional array, determining a corresponding location within the multidimensional space; based on a value of the spatial representation associated with the corresponding location, determining an
(Continued)

actuation intensity; and controlling the haptic actuator to actuate based on the actuation intensity.

18 Claims, 8 Drawing Sheets

(51) Int. Cl.
*G10H 3/26* (2006.01)
*G10H 1/045* (2006.01)
(52) U.S. Cl.
CPC . *G10H 2210/051* (2013.01); *G10H 2210/056* (2013.01); *G10H 2210/066* (2013.01); *G10H 2210/076* (2013.01); *G10H 2220/321* (2013.01); *G10H 2220/351* (2013.01); *G10H 2220/391* (2013.01); *G10H 2220/395* (2013.01); *G10H 2240/211* (2013.01); *G10H 2250/215* (2013.01)
(58) Field of Classification Search
CPC ...... G08B 6/00; G10H 1/0025; G10H 1/0033; G10H 1/32; G10H 3/12; G10H 2210/051; G10H 2210/056; G10H 2220/311; G10L 15/063; G10L 25/30
USPC ...................................................... 340/407.1
See application file for complete search history.

(56) References Cited

U.S. PATENT DOCUMENTS

| | | | |
|---|---|---|---|
| 4,926,879 A | 5/1990 | Sevrain et al. | |
| 5,553,148 A * | 9/1996 | Werle ..................... | H04R 5/023 |
| | | | 381/151 |
| 6,027,463 A * | 2/2000 | Moriyasu ............ | A61H 23/0236 |
| | | | 601/46 |
| 6,272,466 B1 | 8/2001 | Harada et al. | |
| 6,671,618 B2 | 12/2003 | Hoisko | |
| 7,146,218 B2 | 12/2006 | Esteller et al. | |
| 7,222,075 B2 | 5/2007 | Petrushin | |
| 7,232,948 B2 * | 6/2007 | Zhang .................. | G10H 1/0033 |
| | | | 704/246 |
| 7,921,069 B2 | 4/2011 | Canny et al. | |
| 7,979,146 B2 | 7/2011 | Ullrich et al. | |
| 8,005,681 B2 | 8/2011 | Hovestadt et al. | |
| 8,068,025 B2 | 11/2011 | Devenyi et al. | |
| 8,588,464 B2 | 11/2013 | Albertson et al. | |
| 8,754,757 B1 | 6/2014 | Ullrich et al. | |
| 8,952,888 B2 | 2/2015 | Van Den Eerenbeemd et al. | |
| 9,019,087 B2 | 4/2015 | Bakircioglu et al. | |
| 9,298,260 B2 | 3/2016 | Karaoguz et al. | |
| 9,324,320 B1 | 4/2016 | Stolcke et al. | |
| 9,443,410 B1 | 9/2016 | Constien | |
| 9,613,619 B2 | 4/2017 | Lev-Tov et al. | |
| 9,626,845 B2 | 4/2017 | Eagleman et al. | |
| 9,659,384 B2 | 5/2017 | Shaji et al. | |
| 9,735,364 B2 | 8/2017 | Cheng et al. | |
| 9,905,090 B2 | 2/2018 | Ullrich et al. | |
| 9,987,962 B1 * | 6/2018 | Salter ....................... | B60N 2/90 |
| 2002/0194002 A1 | 12/2002 | Petrushin | |
| 2003/0067440 A1 * | 4/2003 | Rank .................. | A63F 13/5255 |
| | | | 345/156 |
| 2003/0117371 A1 * | 6/2003 | Roberts .................. | G06F 3/014 |
| | | | 345/156 |
| 2003/0151597 A1 * | 8/2003 | Roberts ................ | G09B 21/004 |
| | | | 345/173 |
| 2003/0158587 A1 | 8/2003 | Esteller et al. | |
| 2005/0113167 A1 * | 5/2005 | Buchner .................. | A63F 13/02 |
| | | | 463/30 |
| 2007/0041600 A1 | 2/2007 | Zachman | |
| 2007/0242040 A1 | 10/2007 | Ullrich et al. | |
| 2008/0120029 A1 | 5/2008 | Zelek et al. | |
| 2009/0006363 A1 | 1/2009 | Canny et al. | |
| 2009/0012638 A1 * | 1/2009 | Lou ........................ | G11B 27/28 |
| | | | 700/94 |
| 2009/0096632 A1 | 4/2009 | Ullrich et al. | |
| 2010/0302033 A1 | 12/2010 | Devenyi et al. | |
| 2011/0202155 A1 * | 8/2011 | Ullrich .................... | G06F 3/016 |
| | | | 700/94 |
| 2011/0202337 A1 * | 8/2011 | Fuchs ..................... | G10L 19/20 |
| | | | 704/231 |
| 2011/0221694 A1 | 9/2011 | Karaoguz et al. | |
| 2013/0218456 A1 | 8/2013 | Zelek et al. | |
| 2013/0265286 A1 * | 10/2013 | Da Costa ................ | G06F 3/016 |
| | | | 345/177 |
| 2014/0064516 A1 * | 3/2014 | Cruz-Hernandez ...... | G08B 6/00 |
| | | | 381/98 |
| 2014/0363138 A1 | 12/2014 | Coviello et al. | |
| 2015/0025895 A1 | 1/2015 | Schildbach | |
| 2015/0120289 A1 | 4/2015 | Lev-Tov et al. | |
| 2015/0161995 A1 | 6/2015 | Sainath et al. | |
| 2015/0294597 A1 | 10/2015 | Rizzo | |
| 2015/0356889 A1 * | 12/2015 | Schwartz ............. | G09B 21/009 |
| | | | 340/4.12 |
| 2016/0012688 A1 | 1/2016 | Eagleman et al. | |
| 2016/0026253 A1 | 1/2016 | Bradski et al. | |
| 2016/0027338 A1 * | 1/2016 | Ebeling ................ | G09B 21/009 |
| | | | 340/4.12 |
| 2016/0049915 A1 * | 2/2016 | Wang ................... | H03G 3/3089 |
| | | | 381/107 |
| 2016/0098844 A1 | 4/2016 | Shaji et al. | |
| 2016/0098987 A1 | 4/2016 | Stolcke et al. | |
| 2016/0187987 A1 | 6/2016 | Ullrich et al. | |
| 2016/0254454 A1 | 9/2016 | Cheng et al. | |
| 2016/0255944 A1 | 9/2016 | Baranski et al. | |
| 2016/0292856 A1 | 10/2016 | Niemeijer et al. | |
| 2016/0297611 A1 | 10/2016 | Williams et al. | |
| 2017/0206889 A1 | 7/2017 | Lev-Tov et al. | |
| 2018/0284894 A1 | 10/2018 | Raut et al. | |
| 2018/0374264 A1 | 12/2018 | Gatson et al. | |
| 2019/0337451 A1 | 11/2019 | Bacchus et al. | |

OTHER PUBLICATIONS

International Search Report and Written Opinion for PCT Application No. PCT/US2017/050288 dated Nov. 8, 2017.
Horvath et al., FingerSight: Fingertip Haptic Sensing of the Visual Environment, Mar. 6, 2014, IEEE, vol. 2, 2014 (Year: 2014).
Jones et al., Development of a Tactile Vest, 2004, IEEE, 0-7695-2112-6/04 (Year: 2004).
Nakamura et al., An Actuator for the Tactile Vest—a Torso-Based Haptic Device, 2003, IEEE, 0-7695-1890-7/03 (Year: 2003).
Paneels et al., What's Around Me? Multi-Actuator Haptic Feedback on the Wrist, Apr. 14-18, 2013, IEEE, 978-1-4799-0088-6/13, pp. 407-412 (Year: 2013).
Tapson et al., The Feeling of Color: A Haptic Feedback Device for the Visually Disabled, 2008, IEEE, 978-1-4244-2879-3/08, pp. 381-384 (Year: 2008).

* cited by examiner

METHOD AND SYSTEM FOR DETERMINING AND PROVIDING SENSORY EXPERIENCES

CROSS-REFERENCE TO RELATED APPLICATIONS

This application claims the benefit of U.S. Provisional Application Ser. No. 62/367,475, filed on 27 Jul. 2016, which is incorporated in its entirety by this reference.

TECHNICAL FIELD

This invention relates generally to the sensory experience field, and more specifically to a new and useful system and method for determining and providing sensory experiences.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
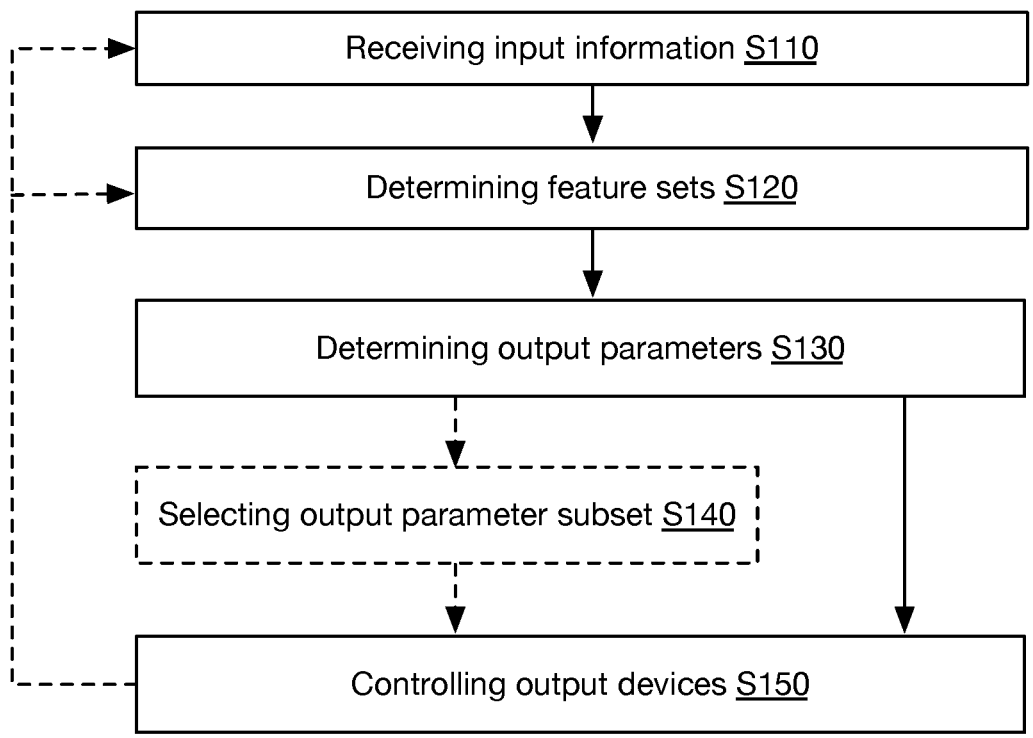
FIG. 1 is a flowchart diagram of the method.
Figure 2:
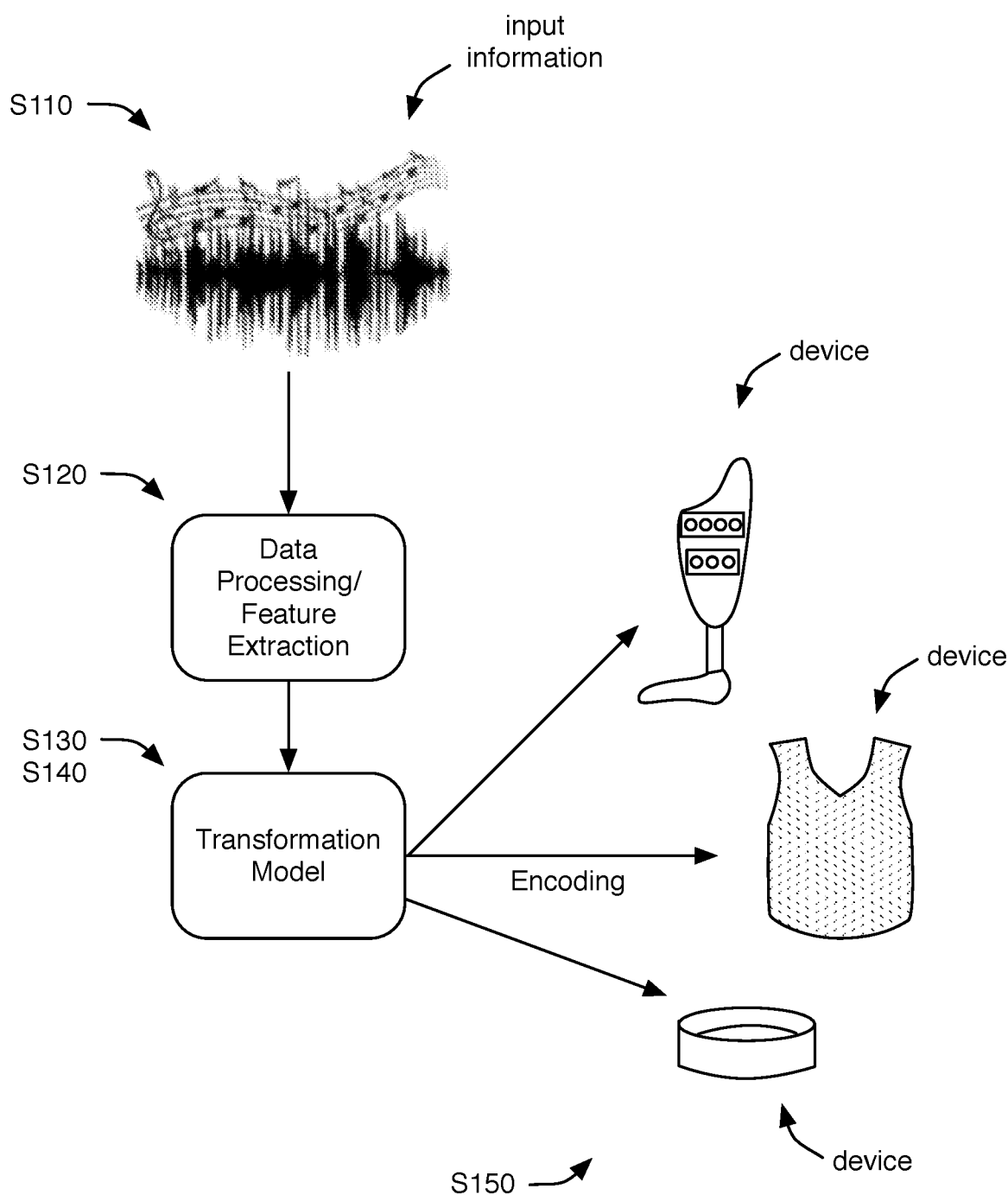
FIG. 2 is a schematic representation of an embodiment of the method.

A method 100 for determining and/or providing outputs (e.g., haptic outputs) using output devices in proximity to a user preferably includes: receiving input information S110, determining input feature sets associated with the input information S120, determining outputs associated with the feature sets S130, and controlling output devices based on the output parameters S150 (e.g., as shown in FIGS. 1-2). The method 100 can optionally include selecting a subset of the output parameters S140. However, the method can additionally or alternatively include any other suitable elements, and can be performed in any suitable manner.

The method 100 preferably functions to transform input information (e.g., representations of music, such as music in an environment of a user) into device outputs (e.g., provided stimuli), preferably outputs of a different domain, dimensionality, and/or rate than the input information. As such, the method 100 can be used for users without sensory conditions (e.g., having typical sensory sensitivity), but for whom receiving of information from multiple sensory sources is desired (e.g., to enhance perception and/or enjoyment of the information). The method 100 can additionally or alternatively allow a user with one or more sensory conditions (e.g., reduced sensory sensitivity, enhanced sensory sensitivity, lacking one or more sensory streams, etc.) to receive information that would otherwise be received through the one or more senses.

The method 100 can thus operate to provide a means for sensory substitution, sensory enhancement, and/or sensory cross-boosting to allow a user to receive and process information. The method 100 preferably provides information (e.g., to users with sensory conditions) through touch sensation. However, the method 100 can additionally or alternatively implement any other suitable sensory substitution or sensory boosting regime. In specific applications, the method 100 can operate to allow a user (e.g., with hearing conditions and/or other sensory conditions, without sensory conditions, etc.) to receive outputs related to music (e.g., music being played in the user's environment), such as outputs intended to increase the user's enjoyment of the music, using a wearable system including a distribution of haptic interface devices. However, in variations of the example, the method 100 can be used to promote enhanced sensation of non-audio inputs (e.g., olfactory stimuli, taste stimuli, etc.).

The method 100 can thus be implemented using system components described in more detail below, and/or using an embodiment, variation, or example of the system described in U.S. application Ser. No. 14/750,626, titled "Providing Information to a User Through Somatosensory Feedback" and filed on 25 Jun. 2015, which is herein incorporated in its entirety by this reference. However, the method 100 can additionally or alternatively be implemented using any other suitable system or system components for providing information to users through feedback devices.

2. Benefits

The method 100 can confer a number of benefits. First, embodiments of the method 100 can function to transform inputs with characteristic dimensionality and/or speed into outputs (e.g., device outputs provided to a user as sensory inputs) with different dimensionality and/or speed (e.g., transforming low-dimensionality, high-speed input information such as sound information into higher-dimensionality, lower-speed outputs such as tactile outputs; transforming high-dimensionality and/or high-speed input information into lower-dimensionality and/or lower-speed outputs; etc.). In examples, the relationship can be inversely proportional (e.g., as in sound-to-touch for speech processing, which processes a low dimensional and high speed stream into a high dimensional and low speed stream). Such transformation can enable mapping of the input information to different output domains (e.g., domains in which higher-dimensionality and/or higher-speed outputs may be more difficult to generate and/or experience, such as the tactile sensory domain (i.e., a high-dimensionality domain), as compared with the input information domain).

Second, embodiments of the method 100 can generate outputs based on, but not necessarily easily mapped back to, the input information. Rather than attempting to impart the same information as the input information (e.g., via a mapping to outputs from which a user can reconstruct the input information), such embodiments can function to impart similar (or otherwise related) emotional experiences.

Thus, embodiments of the method 100 can function to supplement and/or substitute for other sensory experiences (e.g., associated with the input information), which could enable enjoyment (e.g., by a user with a sensory condition, such as a hearing condition) of related experiences to the sensory experiences of those without such conditions (e.g., concurrent enjoyment alongside those without sensory conditions, asynchronous enjoyment, etc.). Additionally or alternatively, embodiments of the method 100 can function to enhance (e.g., make more interesting, enjoyable, exciting, etc.) the sensory experience of a user (e.g., a user with or without sensory conditions). For example, when a user concurrently experiences outputs generated by the method, along with the original sensory sensations associated with the input information (e.g., listening to music while experiencing haptic outputs generated based on the music), the outputs can enhance the user's experience of the original sensory sensations.

Third, embodiments of the method 100 can be a strong motivator for inducing movement in users. This may help mitigate adverse health effects due to lack of movement, such as pressure sores, and/or help to promote cardiovascular health and calorie burn. Such effects can be especially beneficial when employed using a system that includes a seat (e.g., wherein users may be in static contact with the seat for prolonged periods of time).

Fourth, embodiments of the method 100 can include changing and/or adaptive elements, which can further increase user enjoyment. For example, algorithms (e.g., for feature detection and/or selection, for mapping to outputs, etc.) can slowly morph over time, and/or the algorithm parameters and/or types can be selected based on the incoming audio statistics (e.g. based on whether the music contains mostly rhythmic vs arrhythmic elements).

However, the method 100 can additionally or alternatively confer any other suitable benefits.

3. System

Figure 3A:
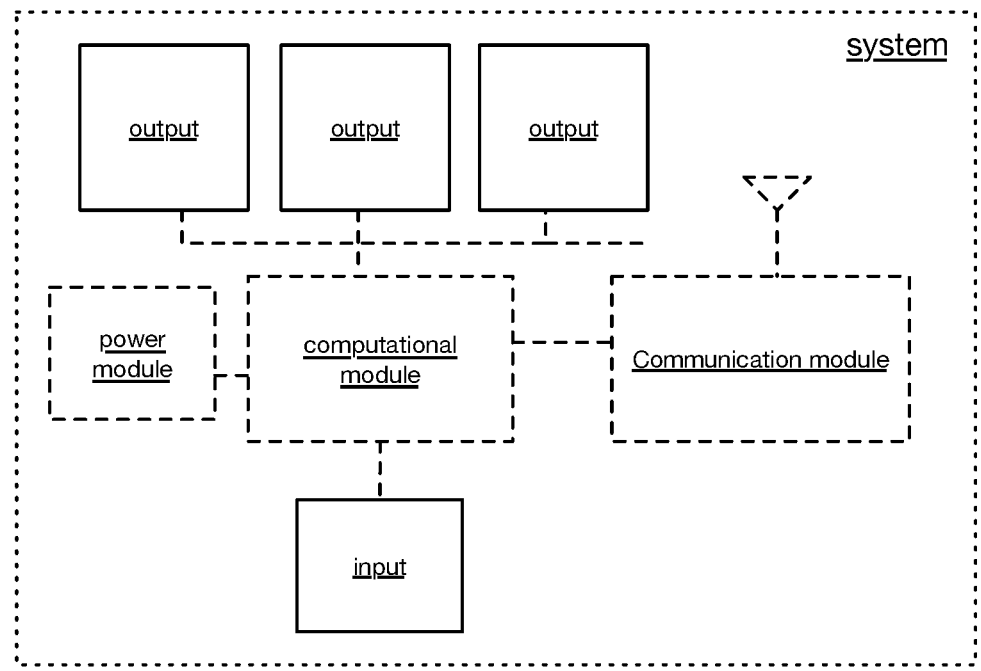
FIGS. 3A-3B are schematic representations of an embodiment of the system and a variation of the embodiment, respectively.
Figure 3B:
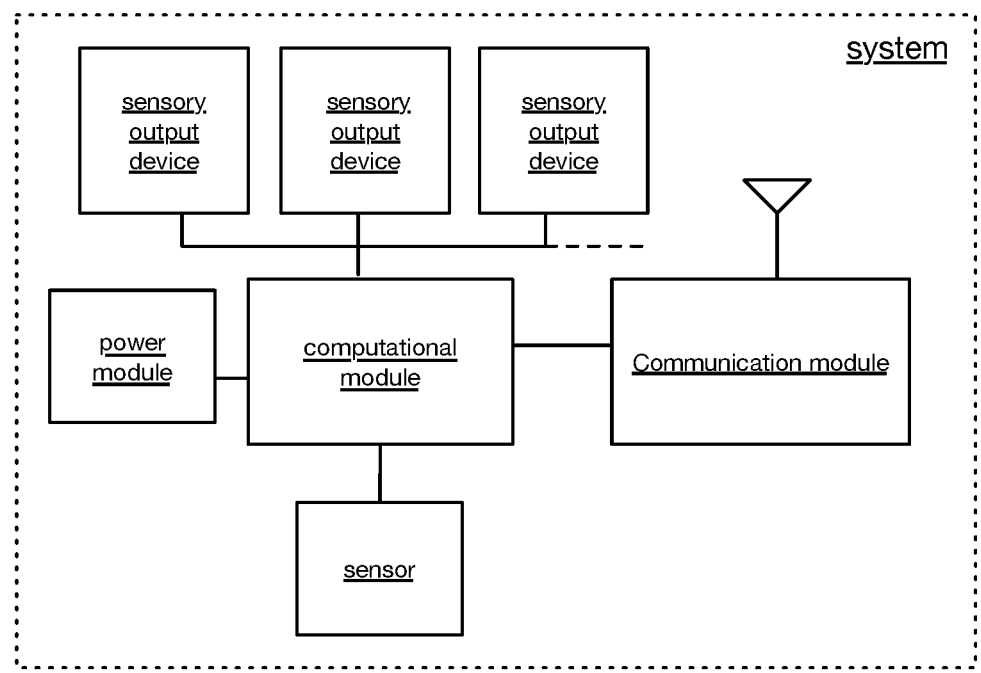

The system preferably receives one or more inputs and provides one or more outputs (e.g., through sensory output devices), and can optionally include one or more communication modules, power modules, and/or computational modules (e.g., as shown in FIGS. 3A-3B). The outputs are preferably disposed in a single device, but can additionally or alternatively be disposed across a plurality of devices, and/or be disposed in any other suitable manner.

Figure 4A:
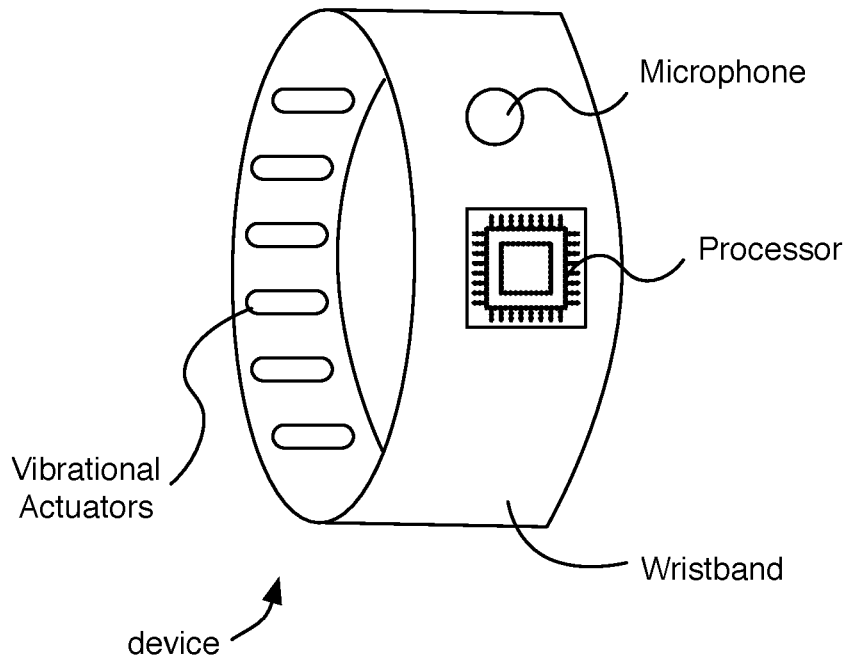
FIGS. 4A-4B are a first and second example of a wearable device of the system, respectively.
Figure 4B:
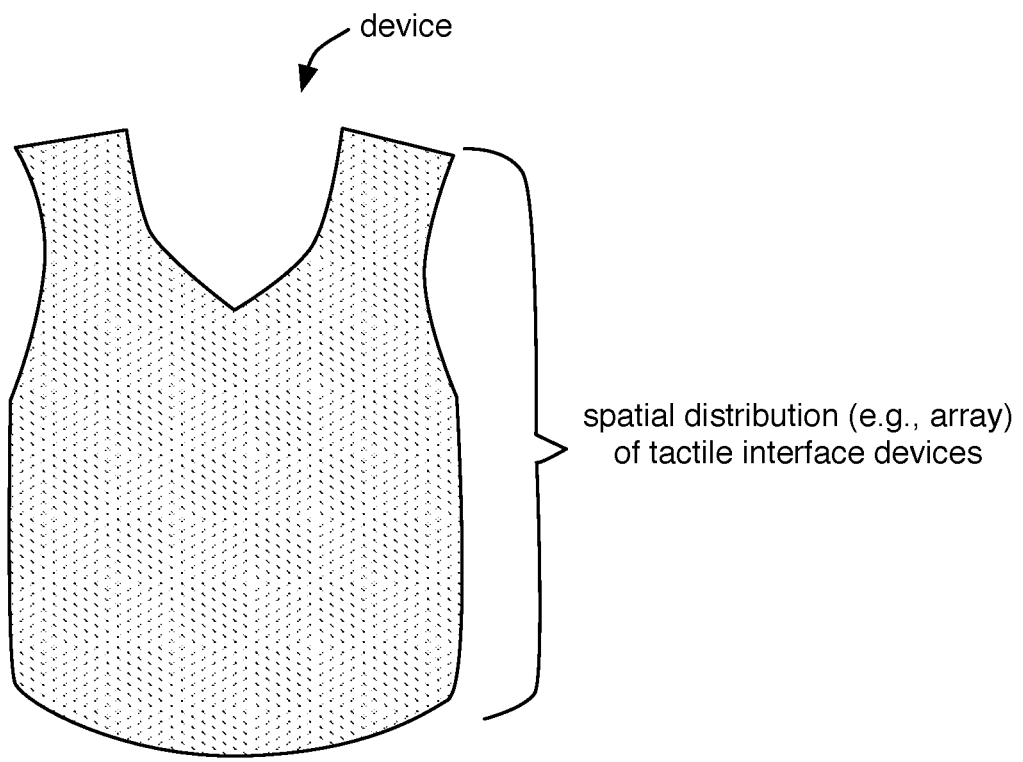

The outputs can include a plurality of tactile interface devices (e.g., haptic actuators, electrical stimulators, etc.) in a spatial distribution (e.g., multidimensional spatial distribution), each of which has a range of available output stimuli with different stimulus parameters (e.g., as shown in FIGS. 4A-4B). The device can provide haptic stimuli through the tactile interface devices, and in specific examples, can include an array of tactile interface devices operable to provide configurable haptic stimuli to a user. The tactile interface devices can include eccentric rotating mass (ERM) devices, Linear Resonant Actuators (LRAs), piezoelectric devices, and/or any other suitable devices (and/or combinations thereof, such as hybrid devices incorporating both ERM and LRA elements). The outputs can additionally or alternatively provide one or more of: auditory stimuli, electrical stimuli (e.g., peripheral stimuli, etc.), olfactory stimuli, taste stimuli, and any other suitable form of stimulus.

The spatial distribution (e.g., array) of tactile interface devices can have a density from 5 devices per $cm^2$ to 50 devices per $cm^2$, or any other suitable density. Furthermore, the spatial distribution of tactile interface devices can be configured with any suitable morphological aspects. The tactile interface devices are preferably arranged in one or more arrays, preferably high-density arrays but additionally or alternatively arrays of any suitable density. The arrays can include multidimensional arrays (e.g., planar array, 3-dimensional volumetric array, array defined substantially along one or more device surfaces, etc.), single-dimensional arrays (e.g., linear array, curvilinear array, etc.), and/or any other suitable arrays. For example, the device can include a two-dimensional array (e.g., defined substantially on a plane, defined on a curved and/or bent surface, etc.). The arrays can be configured as one or more of: a circular array, an ellipsoidal array, a polygonal array (e.g., a triangular array, rectangular array, a pentagonal array, a hexagonal array, etc.), a circumscribing array, an amorphous array, an array substantially spanning the support structure with which the array is integrated, and any other suitable array type. Additionally or alternatively, the device can include an irregular distribution of tactile interface devices (e.g., arranged substantially on a surface and/or within a volume of the device) and/or any other suitable arrangement of tactile interface devices. Furthermore, the spatial distribution (e.g., array) can be configured across different layers of the overarching device coupled to the user.

In a first embodiment, the tactile interface devices are configured to be carried with a user (e.g., worn by the user, in proximity to the user). In this embodiment, the tactile interface devices are preferably integrated into a wearable garment, wherein the garment can comprise a top (e.g., shirt, vest, etc.), a bottom (e.g., pants, shorts, skirt, etc.), a headpiece (e.g., headband, earmuffs, hat, etc.), a backpack, an undergarment, socks, and any other suitable form of garment. Additionally or alternatively, the tactile interface devices can be configured to be mechanically coupled to the wearable garment (e.g., retained in one or more pockets of the garment, attached by fasteners such as buttons, clips, magnets, and/or hook-and-loop fasteners, attached by adhesive, etc.). Additionally or alternatively, the tactile interface devices can be configured to attach directly to a user (e.g., by suction, adhesive, etc.), preferably to one or more skin surfaces of the user. Additionally or alternatively, the tactile interface devices can be incorporated into one or more wearable devices (e.g., a head-mounted wearable device, a limb-coupled wearable device such as a wristband or ankle band, etc.) and/or implanted devices. Additionally or alternatively, the tactile interface devices can be incorporated into prosthetic devices (e.g., lower limb prosthetics, upper limb prosthetics, facial prosthetics, etc.). In an example, such as shown in FIG. 4B, the array of tactile interface devices can be integrated with a vest garment operable to be worn by a user as the user moves about in his/her daily life.

Figure 5:
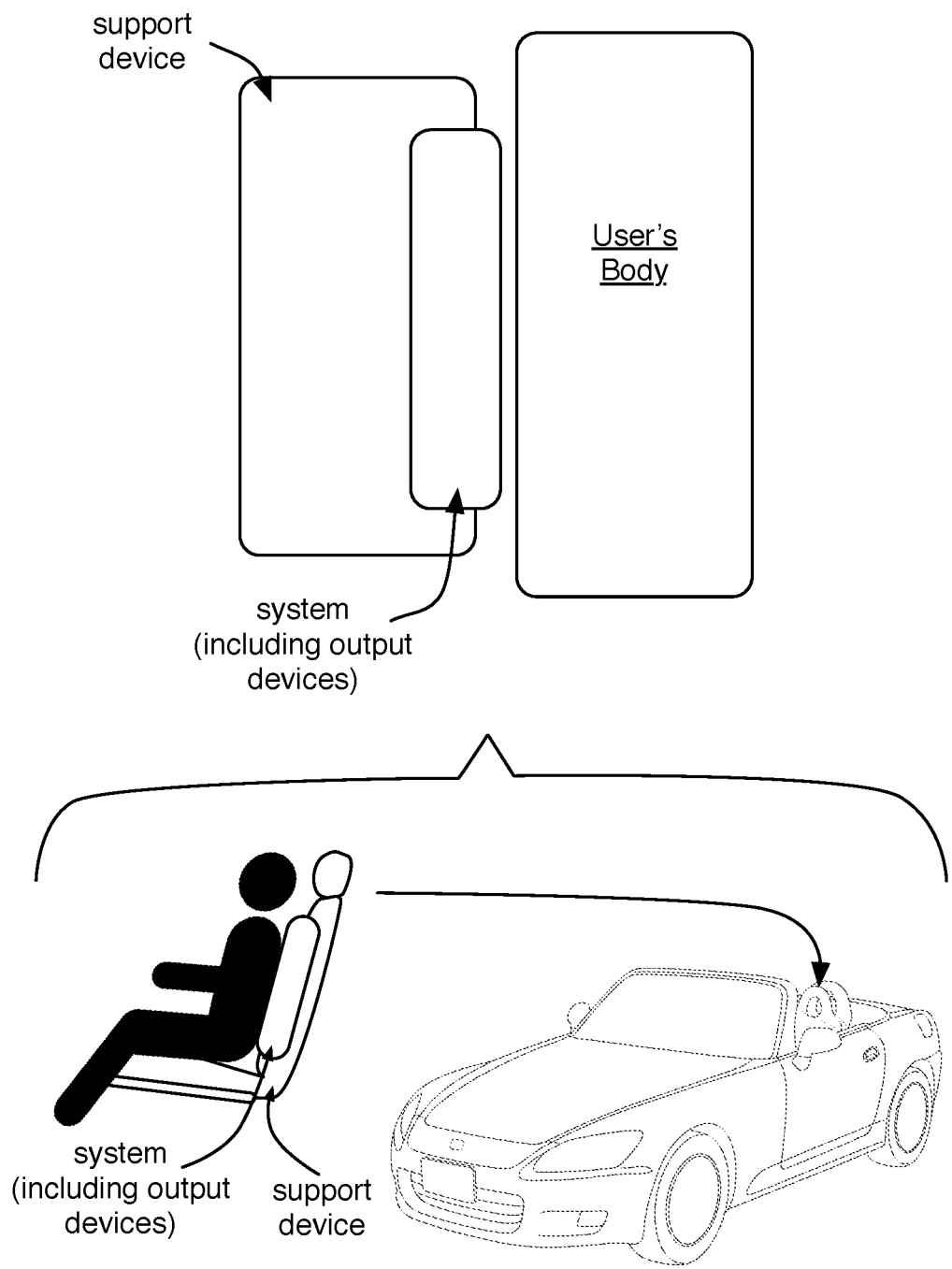
FIG. 5 is an example of a device of the system.

In a second embodiment, such as shown in FIG. 5, the tactile interface devices are configured to be mechanically coupled to the user by a support device that supports the user (e.g., by a support element of the support device). For example, the tactile interface devices can be integrated into the support element and/or arranged between the user and the support element (e.g., resting on top of the support element). The support devices can include seats, couches, beds, platforms (e.g., for sitting and/or standing on), walls, inclined surfaces (e.g., configured to support a leaning user), and/or any other suitable support devices. In a first variant, the support device is a component of a vehicle (e.g., car, but, train, plane, boat, etc.), such as a car seat. In a second variant, the support device is within an entertainment venue, such as a concert venue, theater, movie theater, residential TV or music room, and/or amusement park (e.g., wherein the support device is part of a roller coaster or simulated motion ride). However, the support device can additionally or alternatively include any suitable support device in any suitable setting (e.g., in a residence, office, food service venue, bookstore, etc.).

Additionally or alternatively, the tactile interface devices can be disposed in a device configured to be held by the user (e.g., hand-held, held between an arm and torso of the user, held between the legs of the user, etc.). Additionally or alternatively, the tactile interface devices can be disposed in a device configured to rest on the user (e.g., retained against the user by gravity), such as a blanket. However, the tactile interface devices can additionally or alternatively be couplable to the user (and/or otherwise configured to interact with the user) in any other suitable manner.

Each tactile interface device (and/or other output unit) is preferably controlled by independent signals and configured to actuate independently from the other output units. Alternatively, a group of output units (e.g., a cluster or subset of the output units) can be independently controlled, such that the group of output units can operate independently from the other output units. Each controlled subset (e.g., individual output unit or cluster) can include one or more output units of the same or different types. In variations, in addition to or in alternative to controlling subsets of actuators to convey info as a function of features (e.g. in a first group for kicks, in a second group for vocal sounds, etc.), subsets can be used to map a numerical input to a multi-actuator output. In an example, to make the impression of "sweeps" (e.g., turning actuators on and off in quick succession), one could analyze a frame of music and track the strongest/loudest frequency and control the actuators to produce upward/downward "sweeps" as a function of whether the frequency increased or decreased from a previously analyzed frame.

Each controlled subset is preferably individually identified, such that it has a locally unique identifier (e.g., index value), but can alternatively share an identifier with a second controlled subset of the device, or be otherwise identified. Each controlled subset (or the respective identifier) is preferably associated with a known, stored spatial position on the device (controlled subset position). The controlled subset position can include an arcuate position, radial position, position along an axis (e.g., lateral axis, longitudinal axis, etc.), set of coordinates, grid position, position relative to another device component (e.g., sensor, different output unit, etc.), or be any other suitable position. The controlled subset positions can be stored by the device (e.g., on volatile or non-volatile memory), can be encoded (e.g., implicitly, explicitly) via a reindexing module (e.g., reindexing array), and/or stored (and/or otherwise made available) by any other suitable system. In one implementation, one can store the locations implicitly via a reindexing array—so the controlled positions (subset or otherwise) may not need to be explicitly stored. In this implementation, each control frame of data to the device is an array of values, where each element is the value for how strongly an actuator should be set. At the furthest end, the ordering of the array is typically random/is a function of how the hardware is actually wired+ connected. Thus, one can implement a re-indexing array upstream of an algorithm output (which typically has an obvious ordering) and then a translating index array that dictates how the pattern is mapped spatially. However, storing can additionally or alternatively be implemented in any other suitable manner.

Each controlled subset is preferably wired in parallel relative to other controlled subsets of the device, but can alternatively be wired in series, wired in a combination of in parallel and in series, or be wired in any other suitable manner (or not be wired). The controlled subsets of the device are preferably controlled by the processor, but can additionally or alternatively be controlled by a remote computing system (e.g., server system), external device (e.g., mobile device, appliance, etc.), and/or any other suitable computing system.

The input(s) of the system can include sensors (e.g., disposed in the same device(s) as the outputs, separate from the outputs, etc.), inputs configured to receive information sampled by sensors, and/or other data connections, but can additionally or alternatively include any other suitable inputs. The inputs can include local sensors (e.g., sensing an environment of the device and/or user), remote sensors (e.g., sensing a separate environment), virtual inputs (e.g, associated with a virtual environment), and/or any other suitable inputs.

The inputs preferably include audio and/or music inputs. For example, the inputs can include microphones and/or other audio sensors, audio and/or music data inputs (e.g., analog electrical connectors such as audio line in connectors; digital electrical and/or optical connectors configured to receive audio and/or music information such as HDMI, TOSLINK, MIDI, etc.; generic computer data connectors such as USB, Ethernet, etc.; wireless connections such as those enabled by a wireless communication module of the system; etc.), and/or any other suitable audio inputs. The inputs can additionally or alternatively include inputs associated with other sensory experiences (e.g., visual, tactile, olfactory, taste, etc.), other environmental information (e.g., location, location type, velocity, temperature, humidity, etc.), and/or any other suitable information.

The sensors can include one or more: cameras (e.g., CCD, CMOS, multispectral, visual range, hyperspectral, stereoscopic, etc.), spatial sensors (e.g., inertial measurement sensors, accelerometer, gyroscope, altimeter, magnetometer, etc.), location sensors (e.g., GPS, GNSS, triangulation, trilateration, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, and/or any other suitable sensors. However, the system can additionally or alternatively include any other suitable inputs.

The communication modules can include wired communication modules (e.g., configured to communicate by wired data connections, such as Ethernet, USB, power line, etc.) and/or wireless communication modules (e.g., radios). The wireless communication modules preferably support (e.g., enable communication using) one or more wireless communication protocols (e.g., WiFi, Bluetooth, BLE, NFC, RF, IR, Zigbee, Z-wave, etc.). However, the system can additionally or alternatively include any other suitable communication modules.

The power module can include one or more power input elements, power storage elements, and/or any other suitable elements. The power module is preferably an electrical power module with an electrical input (e.g., electrical power connection such as a wired connector or inductive loop) and/or electrical storage element (e.g., battery, supercapacitor, etc.), but can additionally or alternatively include any other suitable power input and/or storage elements. The battery is preferably electrically coupled (e.g., connected by conductive wires) to the powered system components, wherein the computational module preferably controls power provision (e.g., as described below), but power provision and/or battery management can additionally or alternatively be performed by any other suitable components.

The computational module can include one or more processors (e.g., CPU or other microprocessor, control circuit, relay system, etc.), computer memory modules (e.g., RAM), computer storage modules (e.g., hard disk drive, flash memory, etc.), and/or any other suitable elements. The computational module is preferably configured to control and/or receive information from the outputs, inputs, communication modules, power modules, and/or any other suitable elements of the system.

The computational module is preferably configured to control the controlled subsets (e.g., output units such as tactile interface devices, groups of output units, etc.) individually. In a first example, the processor is configured to provide control signals to each controlled subset (e.g., to a control element of each controlled subset, such as an actuator control circuit). In a second example, the processor is configured to selectively provide power from the power module to each controlled subset (e.g., by regulating the current provided to each output unit) or to selectively command each controlled subset to enter a mode or attain a setpoint parameter value (e.g., by communicating a command to an integrated controller of each output unit). However, the computational module can additionally or alternatively be configured to control the controlled subsets in any other suitable manner, or can be configured to not control the controlled subsets.

As described earlier, the system can include embodiments, variations, and examples of the device(s) described in U.S. application Ser. No. 14/750,626, titled "Providing Information to a User Through Somatosensory Feedback" and filed on 25 Jun. 2015; however, the system can additionally or alternatively include any other suitable devices and/or device elements.

4. Method 4.1 Receiving Input Information.

Block S110 recites receiving input information, which preferably functions to provide information on which system outputs can be based. The input information is preferably received via the system inputs. For example, the input information can be received from sensors of the system (e.g., information sampled by the sensors), other sensors (e.g., sensors connected to the system, such as by a communication module), computing systems (e.g., from computer storage, generated by the computing system, etc.), other systems, and/or any other suitable source.

The input information can include sensory information (e.g., audio, visual, tactile, olfactory, etc.), music-related information (e.g., music files, MIDI streams, etc.), and/or any other information associated with (e.g., indicative and/or representative of, sampled based on, etc.) a sensory experience (e.g., associated with the environment of the system and/or user, a remote environment, a virtual environment, etc.). The input information can additionally or alternatively include non-sensory information, such as information associated with an environment (e.g., the environment of the system and/or user, a remote environment, a virtual environment, etc.). For example, the input information can include location, speed, acceleration, orientation (e.g., relative to a reference orientation and/or position of the user or of a vehicle occupied by the user), electric and/or magnetic field information (e.g., intensity, orientation, gradient, curl, etc.), navigation information (e.g., turn-by-turn directions), and/or any other suitable information.

The input information is preferably current information (e.g., sent in near real-time to the system, such as streamed substantially concurrent with sampling) and/or advance information (e.g., associated with a sensory experience that is expected to occur at a later time, preferably along with the expected time of occurrence), but can additionally or alternatively include historical information and/or information associated with any other suitable time (or no time).

A first variant of Block S110 includes receiving audio information (e.g., from a car audio system, movie theater system, user device such as a smart phone, etc.) being played (or to be played at a later time) in a user's environment. For example, the audio information can be received as an analog electrical representation (e.g., line in), a digital audio encoding (e.g., computer audio stream or file), a music representation (e.g., staff notation, chord notation, tablature, computerized notation such as MIDI or musicXML, etc.), and/or in any other suitable form. This variant can optionally include receiving timing information associated with the audio information (e.g., synchronization information, such as the time at which a portion of the audio information will be played in the user's environment, tempo at which the music will be played, etc.). For example, the timing information can include an indication that a music track will begin playing at a specific time or after a specific time delay (e.g., 1 second from now).

A second variant of Block S110 includes sampling audio information at a microphone near a set of outputs coupled to a user (e.g., mechanically coupled to the outputs, such as in a device incorporating both the microphone and the outputs).

However, Block S110 can additionally or alternatively receiving any other suitable input information (e.g., olfactory stimuli, taste stimuli, etc.) in any other suitable manner.

4.2 Determining Feature Sets.

Block S120 recites determining one or more feature sets associated with the input information (e.g., determined based on the input information). Block S120 preferably functions to determine characteristics (e.g., important, interesting, and/or potentially useful characteristics) of the input information, such as parameter values associated with the features and/or feature sets, to be used for determining device output parameters.

The feature sets are preferably determined in response to receiving the input information (e.g., Block S120 performed immediately following Block S110). Additionally or alternatively, the feature sets can be determined in response to a trigger. For example, the method 100 can include determining feature sets associated with a time window of a music input in response to timing information indicating that the sensory experience associated with the time window will soon occur in the environment (e.g., the music will soon be played).

Block S120 can optionally include segmenting the input information (e.g., input information received in bulk, such as from an electronic music file) into time windows (e.g., with a duration of 1 ms, 5 ms, 10 ms, 20 ms, 30 ms, 50 ms, 100 ms, 250 ms, 1 s, 5 s, 10 s, 30 s, etc.; time windows determined based on characteristics of the input information; etc.). The time windows can be consecutive, overlapping, and/or have any other relationships. The method 100 can include performing elements of the method for each time window (e.g., repeating Blocks S120-S150 for each time window, based on timing information), and/or performing analysis on the timing windows in any other suitable manner.

The feature sets can be determined based on (e.g., the constituent features can be classified based on) musical parameters/features (and associated parameter values), sensory parameters (e.g., audio parameters, visual parameters, olfactory parameters, tactile parameters, gustatory parameters, etc.), generic parameters, and/or any other suitable parameters. Parameters can include, for example, continuous parameters, discrete parameters, classification parameters, complex-valued parameters, functional parameters, variably-valued parameters (e.g., time-variable, spatially-variable, etc.), textual parameters, and/or any other suitable parameters (e.g., having parameter values of any other suitable form and/or representation). Musical parameters can include beat-related parameters (e.g., beat presence/absence, tempo, pattern, etc.), instrument parameters (e.g., instrument detection and/or classification, sound-instrument associations, etc.), musical pitch (e.g., features and/or parameters associated with a chromagram, harmonic pitch class profiles, etc.), timbre, chords, melodic features and/or parameters, dynamics, and/or any other suitable features and/or parameters. Audio parameters can include features and/or parameters associated with a periodogram (e.g., the result of a frequency transform such as a Fourier-type transform, discrete cosine transform, etc.) and/or non-frequency transform (e.g., wavelets, neural net-based transform, cepstrum, etc.), frequency-specific (and/or frequency band-specific) metrics (e.g., envelope, average energy, etc.), and/or any other suitable parameters. Visual and/or spatial features can include features and/or parameters determined based on image analysis techniques (e.g., segmentation, object recognition, motion detection, etc.), proximity, size, color, brightness, and/or any other suitable parameters. Olfactory and/or gustatory parameters can include chemical compound types, associations with the sensory experiences (e.g., food type, fire, etc.), and/or any other suitable parameters. Tactile parameters can include sensation location, shape, intensity, and/or any other suitable parameters. In one example, determining feature sets can include selecting a subset of frequencies from an input (e.g., filtering out frequencies above 120 Hz from an audio input to obtain a "kicks+bass" track). However, the feature sets can additionally or alternatively include any other suitable information (e.g., parameter values of any other suitable parameters associated with the input information).

Block S120 preferably includes determining parameter values based on the input information (e.g., determining values of parameters associated with features of the input information, such as the features described above), and the feature sets determined in Block S120 preferably include the parameter values (e.g., associated with the constituent features of the feature set). Block S120 can include determining parameter values based on all the input information, based on subsets of the input information (e.g., wherein, for each subset, parameter values determined based on the subset define a feature set), and/or based on any other suitable information. For example, Block S120 can include determining subsets of the input information and determining parameter values based on the subsets (e.g., based on each subset individually, based on combinations of the subsets, etc.). The subsets (e.g., features, feature sets, etc.) can be associated with individual notes, chords, instruments, instrument types or classes, musical roles (e.g., bass, percussion, melody, vocals, solo, lead, backing, etc.); can include input features grouped based on similar characteristics, such as temporally proximal and/or similarly-pitched sounds; can be determined based on machine learning and/or statistical analysis techniques; and/or can be segmented into time windows, such as consecutive time windows of predetermined duration. However, the parameter values can additionally or alternatively be determined based on any other suitable information.

Block S120 can optionally include determining timing information associated with the input information, such as based on music recognition and/or score following. For example, determining timing information can include: identifying (e.g., determining an identifier of, such as a name) a musical piece (e.g., song, instrumental piece, opera, etc.) based on the input information (e.g., an audio signal representative of the musical piece, such as an audio stream sampled by a microphone and/or sent to a speaker), receiving a score associated with the musical piece (e.g., from computer storage; from a remote computing system, such as via a wireless communication module; etc.), and performing score following (e.g., tracking the position in the score of the music being played in the environment) based on the score and input information (e.g., new input information received after the input information based on which the musical piece was identified) to determine the timing information. In this example, the feature sets can optionally be determined based on both the input information (e.g., audio stream) and the score (or, based on only one or the other), and Blocks S130-S150 can optionally be performed based on the feature sets and/or the timing information.

In relation to Block S120, the method 100 can include performing any suitable filtering operations with the feature sets. For instance, the feature sets can be filtered (e.g., subsets of the feature sets can be selected, such as by using a selection algorithm determined using machine learning techniques, by using heuristics, etc.) to remove features not of interest to the user (e.g., based upon sensory condition details, based on typical user preferences, based on personal interest, based on professional interests, etc.). Additionally or alternatively, In relation to Block S120, the method 100 can include performing any suitable prioritization operations with the feature sets. For instance, the feature sets can be processed with a ranking algorithm that prioritizes features of interest to the user (e.g., based on sensory condition details, based on typical user preferences, based on personal interest, based on professional interests, etc.) or de-prioritizes features not of interest to the user (e.g., for a user lacking auditory sensitivity in a high-frequency band but having strong auditory sensitivity in a low-frequency band, including many or all features associated with inputs in the high-frequency band but excluding some or all features associated with inputs in the low-frequency band). However, Block S120 can include post-processing or pre-processing the feature sets in any other suitable manner.

Furthermore, Block S120 can additionally or alternatively be implemented in any other suitable manner (e.g., applying transforms and/or signal decompositions, optionally selecting subsets of the results, such as specific coefficients and/or output values; using a transformation determined using machine learning techniques; applying computer vision algorithms to visual representations of sound, such as performing edge detection on a spectrogram image obtained from transforms of the feature sets; using a mathematical filtering process such as FIR or IIR filtering; etc.). For instance, some variations of Block S120 may additionally or alternatively implement techniques such as one or more of: a discrete cosine transform (DCT) operation that automatically transforms acoustic components into frequency bins associated with encoded outputs (e.g., motors, patterns of motors, combinations of motors, etc.) of Block S130; a fast Fourier transform (FFT) operation, a neural network operation (e.g., autoencoder neural network), and any other suitable operation applicable to music inputs (e.g., to time windows of music inputs). Multiple transformations and/or filters can optionally be combined (e.g., in parallel, in series, etc.). For example, a combination could include performing an FFT on a window, then passing a first subset (e.g., the lower half) of frequency bins through a first processing algorithm (e.g., transform, analysis algorithm, etc.), and passing a second subset (e.g., all frequency bins not included in the first subset, such as the upper half) through a second processing algorithm (e.g., different from the first), then recombining the results of the two processing algorithms using a third processing algorithm.

However, Block S120 can additionally or alternatively include extracting any other suitable feature sets and/or organizing the feature sets in any other suitable manner, embodiments, variations, and examples of which are described in U.S. application Ser. No. 14/750,626 titled "Providing Information to a User Through Somatosensory Feedback" and filed on 25 Jun. 2015, which is herein incorporated its entirety by this reference.

4.3 Determining Output Parameters.

Block S130 recites determining output parameters associated with the feature sets (e.g., determined based on the feature sets, such as by transforming the features of the feature sets). Block S130 preferably functions to use features of interest (and/or parameter values associated with the features) extracted in Block S120, to generate multi-domain encodings associated with outputs of a device coupleable to the user. As such, Block S130 functions to facilitate transformation of input features into signals that can be output using a device (e.g., the device described above) coupled to the user (e.g., by encoding feature- and/or parameter value-derived components for use in controlling outputs of the device).

Block S130 is preferably performed in response to determining the features sets (e.g., performed upon determining the feature sets). Additionally or alternatively, the output parameters can be determined in response to a trigger. For example, the method 100 can include determining output parameters based on features associated with a time window of a music input in response to timing information (e.g., received in Block S110, determined in Block S120, etc.) indicating that the sensory experience associated with the time window will soon occur in the environment (e.g., the music will soon be played). However, Block S130 can additionally or alternatively be performed at any other suitable time.

The output parameters determined in Block S130 preferably define one or more sets (e.g., lists) of output devices and associated output settings (e.g., actuation intensities). The output parameters can additionally or alternatively define a function (e.g., a function over the mathematical space defined by the spatial distribution of output devices) that maps to the output settings (e.g., wherein output settings corresponding to a particular output device can be determined based on the value of the function at the location associated with the output device). The output settings can optionally include time dependence (and/or dependence on any other suitable variables), but can additionally or alternatively be constant.

The output parameters determined based on one or more features and/or feature sets can be mapped to all output devices of the system, a subset of the output device (e.g., a contiguous region, moveable or fixed in place relative to the entire device), and/or any other suitable set of output devices. For example, the output parameters can define one or more regions (e.g., the position such as center position, size, shape, etc.), intensities, and/or durations, determined based on the parameter values of the feature set(s), and can additionally or alternatively include interrelations between the regions, intensities, and/or durations (e.g., ramping up and/or down the size and/or intensity, shifting the shape and/or position, etc.). The mapping between features/feature sets and output device subsets (e.g., regions) can remain constant, and/or can be changed over time (e.g., swapping region assignments, selecting new regions, etc.). For example, during a first time window (e.g., with a predetermined duration), a first region of actuators (e.g., ring-shaped region) is mapped to kicks beats and a second region is mapped to snare hits. In a first specific, during a second time window (e.g., immediately following the first), the first region is mapped to the snare hits and the second region is mapped to the kicks beats (optionally, the region mapping is then returned to the original mapping during a third time window, some other mapping is selected, etc.). In a second specific example, during the second time window, half of the actuators from the first and second regions are mapped to kicks beats, and the other half of the regions is mapped to snare hits. However, the output parameters can additionally or alternatively define any other suitable output characteristics.

Block S130 preferably includes implementing a transformation model with the feature sets, the transformation model operable to transform each feature set into a set of output parameters in a device domain (e.g., the device domain associated with a distribution of tactile interface devices coupled to the user and output aspects of the distribution of tactile interface devices), such as by mapping features and/or parameters (e.g., numerical parameters, such as continuous or categorical variables) of the features to physical output parameters. The transformation model preferably generates output parameters associated with control signals that activate devices of the set of sensory output devices (e.g., tactile interface devices), wherein the control signals can be executed in Block S150 (after optionally being filtered, modified, and/or combined in Block S140, and/or in relation to other feature extraction steps).

In variations, the transformation model can additionally or alternatively include performing one or more of the following associated with extraction of features (e.g., in addition to or in alternative to encoding mappings from features to produce a physical output): a linear Predictive Filtering/Coding (LPC) operation, that produces a set of filter coefficients and an energy feature, wherein the filter coefficients can be converted to frequency-locations in a line spectral pair (LSP) representation (e.g., line spectral frequencies), and the energy feature is mapped to a stimulus feature (e.g., intensity, amplitude, duration, etc.); a decomposition transformation operation, where each dimension represents how much of a basis function is present; a single global axis mapping operation, wherein the possible range of frequencies may be discretized to a set of bands based on the number of tactile interface devices in the array and each element represents represent a band of frequencies; a multiple local axis mapping operation, wherein each LSP is given a different set of tactile interface devices to represent a range of frequencies; a coded local axis mapping operation, wherein each LSP is given a different set of axis representative of the frequency domain using a tree-type code (e.g., a binary code with different levels for different frequency ranges or functions); and any other suitable encoding or mapping operation.

The transformation model can be implemented using a computational module that retrieves a physical layout for the set of tactile interface devices (e.g., from storage, from inputs provided by a user or operator, etc.). Encoding and mapping can additionally or alternatively be implemented in any other suitable manner, such as described in U.S. application Ser. No. 14/750,626, titled "Providing Information to a User Through Somatosensory Feedback" and filed on 25 Jun. 2015.

In relation to the feature sets described in Block S120 above, the transformation model(s) of Block S130 can transform, encode, or otherwise map feature sets associated with the set of objects to one or more of: subdomains (e.g., subregions, sub-clusters, sublayers, etc.) of the array of tactile interface devices; different stimulus aspects associated with the array of tactile interface devices; and any other suitable aspects of the array of tactile stimulus devices.

Figure 6:
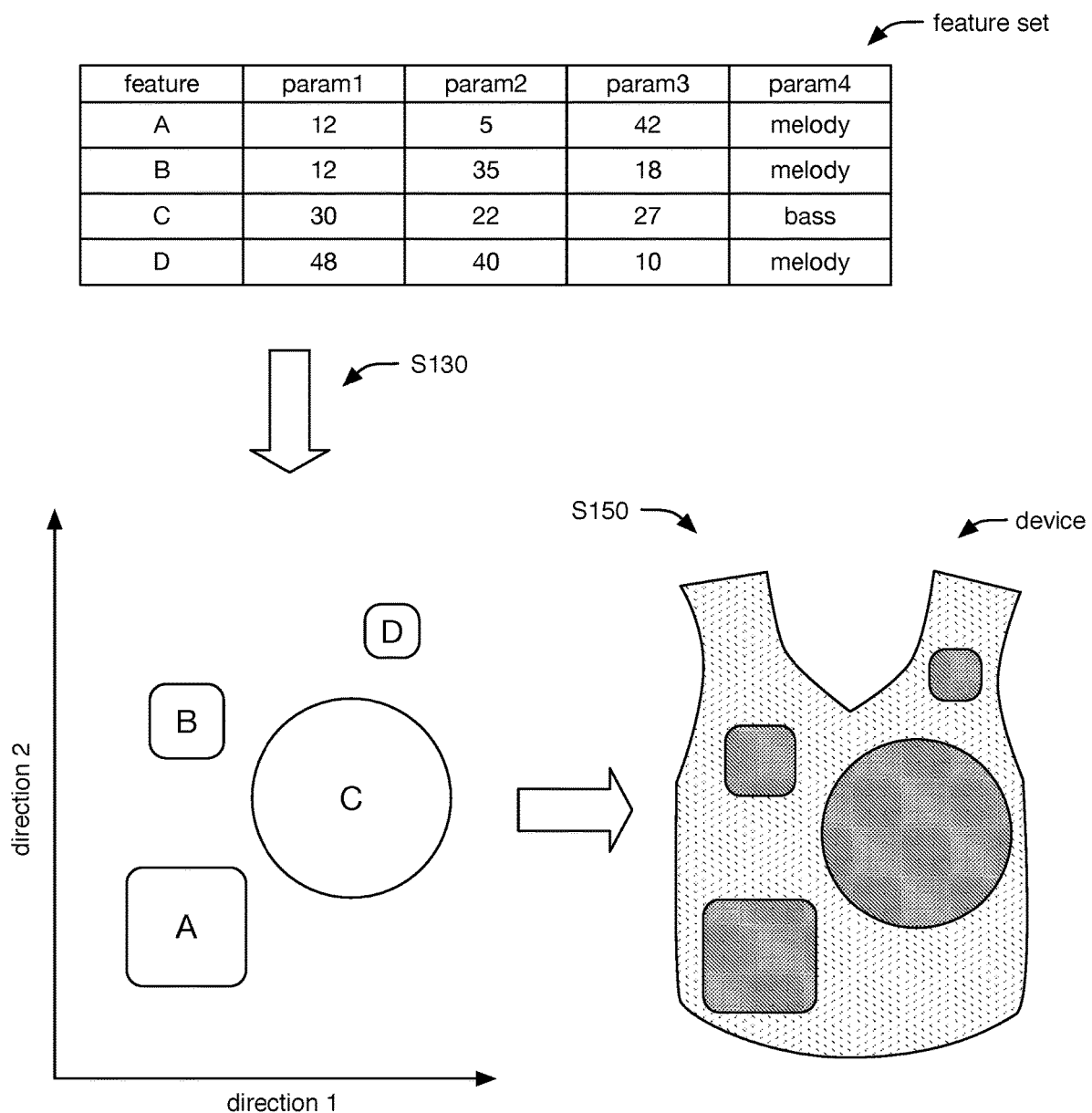
FIGS. 6-7 are a first and second variant of elements of the method, respectively.

In a first embodiment of Block S140, parameters are mapped to different directions in a multidimensional space (e.g., space associated with the spatial distribution of sensory output devices); example shown in FIG. 6. For example, in a two-dimensional space, a first parameter can be mapped to a first direction and a second parameter mapped to a second direction (e.g., the second direction substantially orthogonal the first direction, each direction substantially parallel a device edge, etc.). For each feature of the feature set, a region position is determined based on the parameter values associated with the feature, according to the directions onto which they are mapped (e.g., the position along the first direction is determined based on the value of the first parameter, and the position along the second direction is determined based on the value of the second parameter). In a specific example, features associated with musical chords can be placed along the first direction based on pitch (e.g., pitch of the root note), such as with higher-pitched features placed farther along the first direction, and placed along the second direction based on chord type (e.g., major, minor, diminished, seventh, power, etc.). In this embodiment, other aspects (e.g., size, shape, orientation, intensity, time-dependences, etc.) of the output associated with a feature can optionally be mapped to parameters (e.g., the first and/or second parameter, additional parameters).

Figure 7:
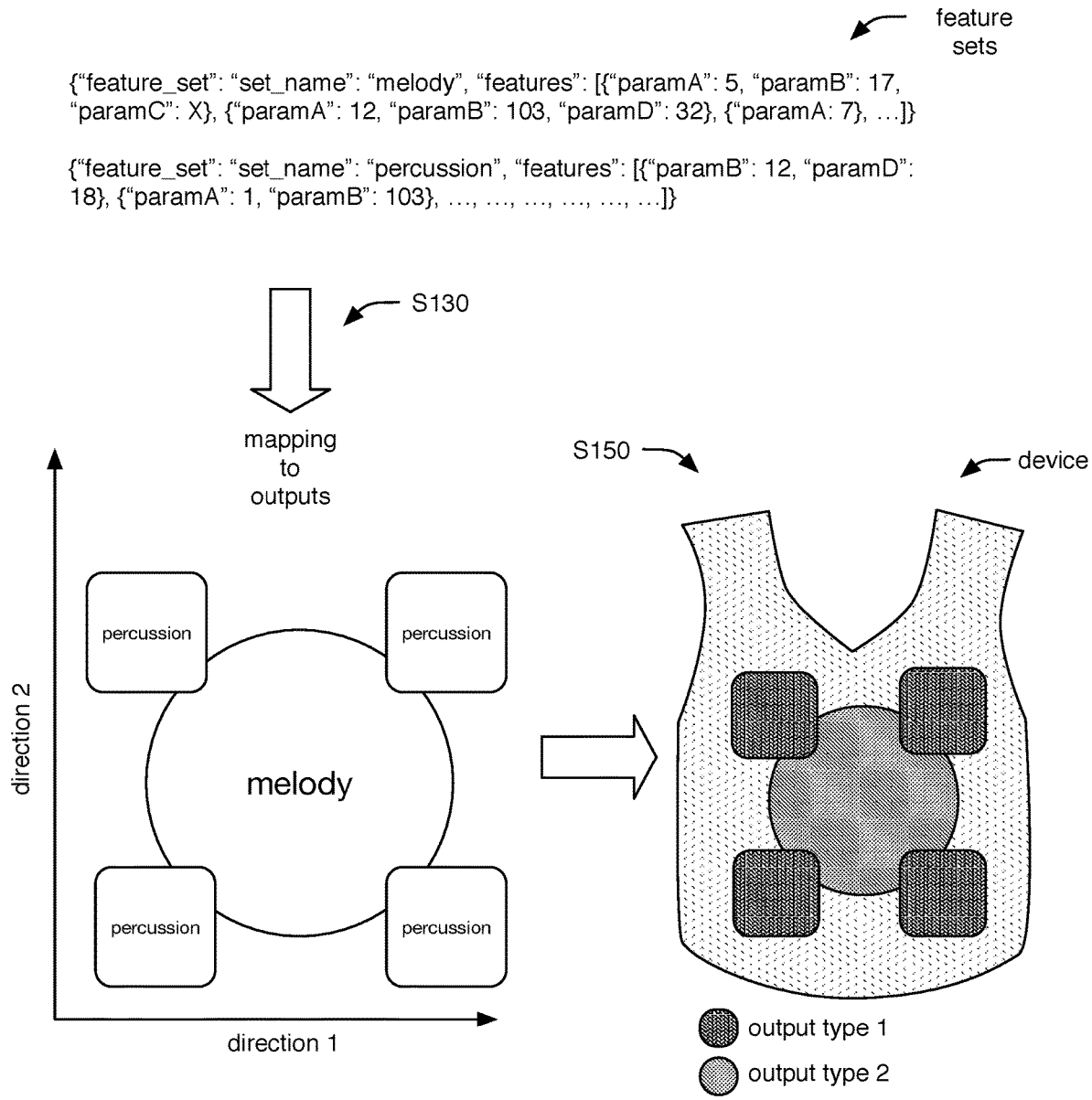

In a second embodiment, features from different feature sets can be associated with outputs in the same or similar regions, or otherwise spatially mixed or superimposed, but can be mapped to different outputs based on the feature set with which they are associated (e.g., as shown in FIG. 7). In a specific example, a melody feature set (e.g., including features that form a high-pitched melody) can be represented by low-intensity actuations at numerous small regions in varying positions. The regions positions can be randomly selected throughout the spatial distribution or a subset (e.g., region) thereof; can be determined based on musical characteristics (e.g., pitch, timbre, change in pitch from previous notes, etc.), such as described elsewhere (e.g., regarding the first and/or third embodiment of Block S140); and/or determined in any other suitable manner. The actuations are preferably synchronized with the features upon which they are based (e.g., with the playing of the note in the environment of the user), but can additionally or alternatively have any other suitable timing. In this specific example, a bass feature set can be represented by high-intensity actuations of a large, central region (e.g., each actuation synchronized to each bass sound such as bass drum hits, bass notes, etc.).

Figure 8A:
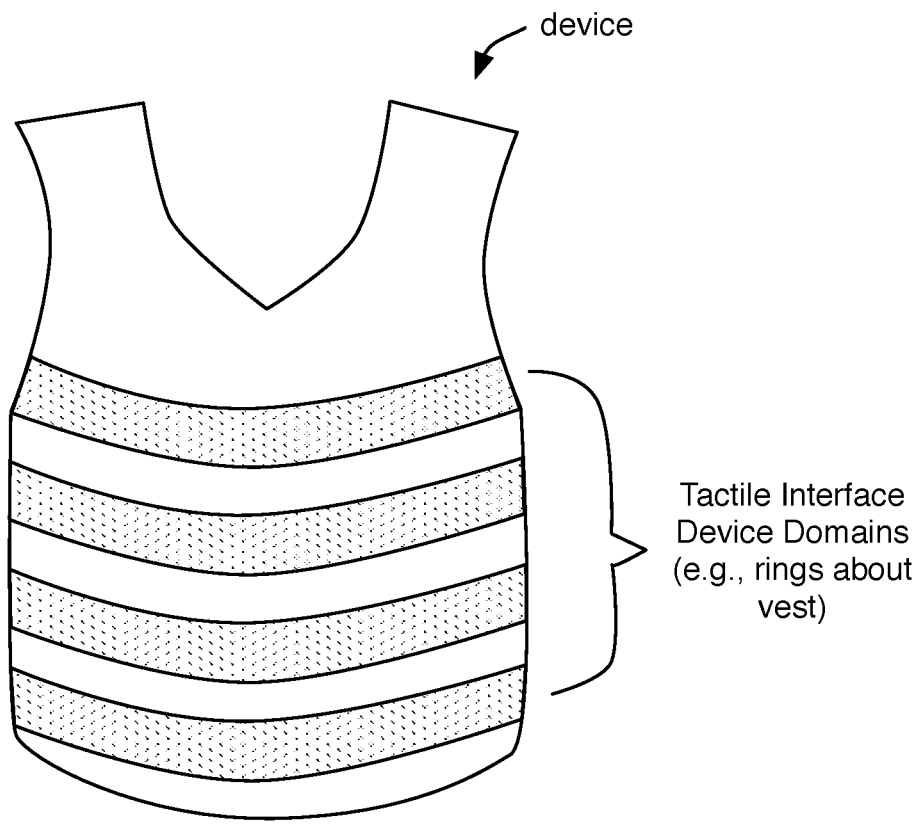
FIG. 8A is an example of output domains of a device of the system.
Figure 8B:
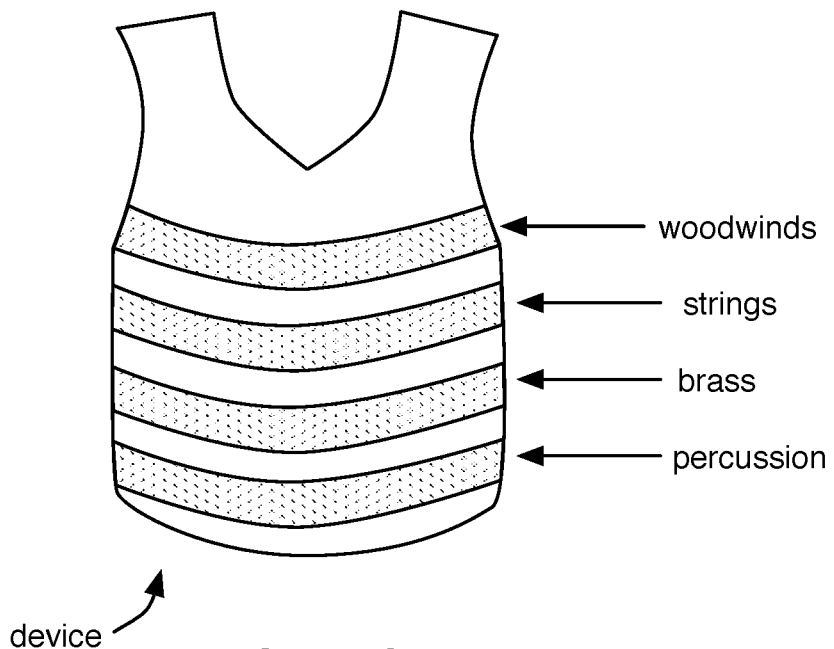
FIG. 8B is an example of feature set mappings to output domains.

In a third embodiment, related to feature sets such as those described in Block S120 above, the transformation model can transform, encode, or otherwise associate aspects of the various feature sets with domains (e.g., layers, regions, clusters, areas, etc.; example shown in FIG. 8A) of the array of tactile interface devices, an example of which is shown in FIG. 8B. Within each domain, the output parameters can be determined in any suitable manner (e.g., as described above, such as regarding the first and/or second embodiments of Block S140) based on the associated feature set (and/or based on any other suitable information).

For instance, in the third embodiment, in a device variation that has a distribution of the array of tactile stimulation devices configured in a set of rings about the torso of the user (e.g., with the array coupled to an upper garment), each ring of the array of tactile stimulation devices can be associated with a different feature set determined in Block S120, such as feature sets including input information elements and/or features (e.g., notes, chords, melodic progressions, etc.) classified as associated with a particular characteristic (e.g., instrument characteristic such as instrument type, role, family, etc.; pitch; beat; timbre; dynamics; etc.). Instruments can include, for example, traditional musical instruments, computer-generated musical tones, vocals, speech, animal noises, environmental noises, and/or any other suitable music generators and/or sound sources, as well as any suitable manipulations thereof (e.g., truncations, speed and/or pitch changes, timbre changes, time reversals, etc.; such as performed using a computerized audio editor). In specific examples, the rings could be associated with instrument characteristics (e.g., a first ring for bass instruments, a second ring for intermediate-pitched instruments, and a third ring for high-pitched instruments; a first ring for percussion instruments and a second ring for melodic instruments; a first ring for woodwinds, a second ring for strings, a third ring for brass instruments, a fourth ring for vocals, and a fifth ring for percussion). In this example, one ring can surround a superior portion of the body of the user (e.g., the chest of the user), another ring can surround an inferior portion of the body of the user (e.g., the waist of the user), and the remaining rings can surround intermediate portions of the body between the first two rings. However, variations of the example can associate rings of the set of tactile stimulation devices with characteristics or classifications (e.g., musical characteristics, audio characteristics, sensory characteristics, etc.) in any other suitable manner. Alternatively, in a device variation that has a distribution of the array of tactile stimulation devices, a first subregion of the array can be associated with a first classification of a musical parameter, a second subregion of the array can be associated with a second classification of the musical parameter, and a third subregion of the array can be associated with a third classification of the musical parameter. In variations of the example, the subregions can have any suitable shape and occupy any suitable region of a support structure coupled to the user's body (e.g., vertical strips arranged in parallel along the user's chest).

In the examples and variations described above, the domains/regions of the array of tactile stimulation devices can be fixed or dynamically modifiable. For instance, the subdomain can be dynamically modified, according to the encodings performed in Block S130, in order to match a shape associated with a feature of the input information. In another example, characteristics of the features can further be represented with dynamically modifiable subdomains. For instance, a more intense feature (e.g., higher volume, more easily perceived, jarring timbre, etc.) can be mapped to a larger subdomain, and a less intense feature can be mapped to a smaller subdomain. However, characteristics of the features can be represented in any other suitable manner.

In variations related to feature sets described in Block S120 above, the transformation model can additionally or alternatively transform, encode, or otherwise associate aspects of the feature sets with stimulus parameters of the array of tactile interface devices. In variations, the transformation operation can result in subdomains of actuators providing stimuli according to a range of parameter types, based upon characteristics of the features. In variations, stimulus parameters can include one or more of: output type (e.g., intermittent, pulsed, continuous, etc.); pulse pattern; pulse waveform characteristics (e.g., sinusoidal, square wave, triangular wave, wavelength, etc.), output amplitude, output intensity; output duration; out pulse duration, etc.), device domains involved in an output, and any other suitable stimulus parameter. In a first example, the transformation model can produce encodings that result in outputs that sweep across a subdomain of the array of tactile interface devices, preferably wherein the sweeping behavior corresponds to speed and direction of a parameter value change (e.g., pitch change) in a feature or feature set (e.g., note bend, melodic progression, fade, etc.), but additionally or alternatively corresponding to any other suitable aspects of the features. In a specific example, the method can include analyzing a frame of music and tracking a prominent feature (e.g., the strongest and/or loudest frequency bin), and making upward and/or downward sweeps based on frequency changes of the feature with respect to the previous frame (e.g., sweeping upward for increased frequency and downward for decreased frequency). In a second example, the transformation model can produce a high intensity pulse for a jarring feature (e.g., strange or discordant sound, sudden loud noise, etc.). However, the transformation operation can additionally or alternatively map any suitable outputs to the feature sets in any suitable manner.

4.4 Selecting Output Parameters.

The method can optionally include Block S140, which recites selecting a subset of the output parameters. Block S140 can function to implement a reduction operation to provide a subportion of available information to the user. Block S140 is preferably performed in response to determining the output parameters (e.g., immediately following Block S130), but can additionally or alternatively be performed at any other suitable time.

In a first embodiment, the output parameters are filtered based on mutual overlap (e.g., spatial overlap, temporal overlap, etc.). For example output parameters associated with a feature of a first feature class (e.g., melody) can be selected only when features of a second feature class (e.g., bass) do not overlap them (spatially and/or temporally).

In a second embodiment, Block S140 can function to allow a user or other entity to receive content in a customized manner. In variations of this embodiment, Block S140 can include receiving an input, provided by the user or another entity, wherein the input includes a selection of types of information that the user would like to be provided with, through the array of tactile interface devices. Block S140 can additionally or alternatively automatically filter the types of information that the user will be provided with through the array of tactile interface devices, based upon characterizations of the user (e.g., characterizations of the user's sensory conditions, characterizations of the user's demographics, characterizations of the user's interests, etc.).

Block S140 preferably includes combining the output parameters (e.g., of the selected subset). In one variation, the output parameters associated with each point in time are combined to generate a global set of output parameters (e.g., used in Block S150 to control the sensory output devices).

For example, for each sensory output device, the associated control signals (e.g., output intensities) from the output parameters determined in S130 can be added, multiplied, averaged, combined using a non-linear function (e.g., sub-linear, super-linear, etc.; preferably monotonically increasing but alternatively decreasing, non-monotonic, etc.), selected based on a statistical characteristic (e.g., maximum, minimum, median, percentile, etc.), and/or combined in any other suitable manner.

Block S140 can additionally or alternatively include modifying the output parameters, preferably before combination but alternatively after combination and/or at any other suitable time. In some embodiments, modifying the output parameters can function to reduce and/or avoid overlap between parameters associated with different features. For example, modifying the output parameters can include translating, rotating, scaling, and/or otherwise altering regions associated with one or more features (e.g., to reduce interference between the outputs).

However, Block S140 can additionally or alternatively include selecting, modifying, and/or combining output parameters in any other suitable manner.

4.5 Controlling Output Devices.

Block S150 recites controlling output devices based on the output parameters. Block S150 preferably includes executing control signals operable to deliver the set of output parameters (e.g., the output parameters determined in Block S130, the subset selected in Block S140, etc.) with the distribution of tactile interface devices coupled to the user. Block S150 preferably functions to enable outputs to be delivered to the user through the tactile interface devices, according to the transformation and encoding algorithms of Blocks S110-S140. The control signals can be executed according to methods described in U.S. application Ser. No. 14/750,626, titled "Providing Information to a User Through Somatosensory Feedback"; however, the control signals can additionally or alternatively be executed in any other suitable manner. For instance, Block S150 can include receiving one or more user inputs operable to adjust a gain level, equalizer levels, and/or other aspect(s) of output stimuli, such that the user can customize the intensity of stimuli provided through the array of tactile interface devices (e.g., of all stimuli, of stimuli associated with particular input and/or output characteristics, etc.).

However, Block S150 can additionally or alternatively include controlling the output devices in any other suitable manner.

4.6 Repetition.

The method 100 can optionally include repeating any or all of the method blocks (e.g., Blocks S110-S150). In one example, the method 100 include receiving a continuous stream of input information (e.g., real-time audio signals, such as sampled at a microphone of the device) in Block S110, and continuously performing Blocks S120-S150 based on the input information (e.g., based on a recently-received subset of the information). In a second example, the method 100 includes receiving bulk input information in Block S110, segmenting the input information into consecutive time windows, and performing Blocks S120-S150 for each time window. However, the method 100 and/or any of its elements can be repeated in any other suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

5. Examples

In one variant, the method includes applying one or more Fourier-type transforms (e.g., real discrete Fourier transform) to windowed audio input data and generating outputs at the device (e.g., vest, chair, etc.) based on the result of the transform(s). In an example of this variant, the energy within each frequency bin is tonotopically mapped to a set of device outputs (e.g., a set of tactile actuators or actuator regions, such as 32 regions), wherein lower-located actuator regions represent lower frequencies and higher-located actuator regions represent higher frequencies, and actuator output intensity corresponds to energy (e.g., the stronger an actuator vibrates translates to how much a frequency is present in the input sound). The output intensity is preferably scaled to its own relative maximum (e.g., within a time window, set of consecutive time windows, boxcar average over time, etc.). Over time, the entire pattern of playback can optionally be shifted (preferably shifted very slowly but alternately at any suitable speed) across the device (e.g., thereby preventing repetitiveness and/or increasing user interest). This variant can optionally utilizes analysis on the variance of the song, as well as variance of the variance of the song in order to generate smooth scaling factors, which can allow playback to be clean and continuous, without sporadic intense flashes due to sudden changes in music.

In a second variant, the method includes applying one or more beat detection algorithms to the audio input data and generating outputs at the device (e.g., vest, chair, etc.) based on the result of the algorithms. Beat detection can be performed on the entire frequency range of the input signal, within specific bands of frequency (e.g., performed separately for each frequency bin, such as bins determined based on a Fourier-type transform), and/or on any other suitable input subsets. For example, beat detection can include observing 1-second windows of past observed audio to calculate an average energy, wherein a potential beat is detected in an incoming audio frame (e.g., time window, such as a window with a duration such as 20 ms, 10 ms, 5 ms, 30 ms, 50 ms, 10-30 ms, etc.) if the energy of the frame exceeds the prior average by a factor based upon the previous frame's variance (e.g., threshold-setting factor generated by examining the variance of the song and calculating a constant value that will best suit the relative amplitude corresponding to that song). In an example in which beat detection is performed on each frequency bin, an incoming frame can be considered a beat when the energy of the top frequency bins are greater than some factor of the average energy in each corresponding bin over a period of a second.

In this variant, in response to detecting a beat, the method preferably includes generating an output at the device. In examples, the output can include: actuating a row (and/or column) of actuators (or subset thereof) at a quantized intensity mapped to the energy of the beat (e.g., wherein the row and/or column changes, such as by incrementing in position, after a predetermined interval, such as a number of beats or a time interval; wherein the row and/or column is determined based on the frequency bin; etc.); actuating a randomly selected set of actuators (e.g., 8 actuators randomly selected for each beat); actuating a ring-shaped region of actuators (e.g., wherein the ring shifts position over time); and/or any other suitable outputs mapped to detected beats.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:
1. A method comprising:
   receiving a music input;
   based on the music input;
      determining a first set of values of a primary musical parameter, wherein the primary musical parameter is an energy parameter, and wherein the primary musical parameter is associated with a first direction of a multidimensional array of haptic actuators;
      determining a second set of values of a secondary musical parameter different than the primary musical parameter, wherein the secondary musical parameter is a musical frequency parameter associated with a second direction of the multidimensional array of haptic actuators different than the first direction, wherein each value of the second set of values is different from the remaining values in the second set of values, and wherein each value of the second set of values is associated with a value of the first set of values;
   based on the first set of values and the second set of values, generating a mapping of the music input to at least a subset of haptic actuators of the multidimensional array of haptic actuators, wherein the subset of haptic actuators comprises multiple haptic actuators, and wherein generating the mapping comprises, for each haptic actuator of the subset of haptic actuators:
      determining a subset of second values associated with the haptic actuator;
      determining a placement along the second direction based on the subset of second values;

determining a subset of first values associated with the subset of second values and associated with the haptic actuator;

determining a placement along the first direction based on the subset of first values;

assigning a vibration intensity to the haptic actuator based on a single first value of a subset of first values, wherein the single first value is the maximum first value of the subset of first values; and at the subset of haptic actuators, cooperatively producing a haptic output based on the mapping.

2. The method of claim 1, further comprising:

based on the primary musical parameter, determining a plurality of input subsets of the music input, wherein each input subset of the plurality is associated with a respective primary musical parameter value of the primary musical parameter; and determining a set of parameter value pairs, comprising, for each input subset of the plurality:

based on the input subset, determining a respective secondary musical parameter value of the secondary musical parameter, wherein the respective secondary musical parameter value is associated with the input subset; and associating the respective primary and secondary musical parameter values in a respective parameter value pair of the set;

wherein:

a parameter value pair of the set comprises the first and second values; and the mapping is generated based on the set of parameter value pairs.

3. The method of claim 2, wherein:

determining the plurality of input subsets comprises determining a respective instrument class associated with each input subset of the plurality.

4. The method of claim 2, further comprising, for each parameter value pair of the set, determining a respective spatial representation segment, wherein the mapping comprises the spatial representation segments.

5. The method of claim 1, further comprising:

receiving a second music input, wherein:

the music input is associated with a first time window of a musical piece; and the second music input is associated with a second time window of the musical piece, the second time window later than the first time window;

based on the second music input, determining a third set of values of the primary musical parameter;

based on the music input, determining a fourth set of values of the secondary musical parameter;

based on the third and fourth sets of values, generating a second mapping of the second music input; and at the plurality of haptic actuators, after producing the haptic output, cooperatively producing a second haptic output based on the second mapping spatial representation.

6. The method of claim 1, wherein the first and second directions are orthogonal.

7. The method of claim 1, wherein receiving the music input comprises receiving a signal via a wireless electronic communication protocol.

8. The method of claim 1, wherein the music input comprises a digital audio file.

9. The method of claim 1, wherein the multidimensional array of haptic actuators is mechanically coupled to a wearable garment, wherein the haptic actuators of the multidimensional array of haptic actuators are arranged with a density of at least 5 haptic actuators per centimeter squared.

10. The method of claim 1, wherein the multidimensional array of haptic actuators is mechanically coupled to a seat.

11. A method comprising:

mechanically coupling a plurality of haptic actuators to a user, the haptic actuators substantially defining a multidimensional array, wherein the plurality of haptic actuators is mechanically coupled to a wearable garment and arranged with a density of at least 5 haptic actuators per centimeter squared;

receiving a music input;

based on the music input:

determining a first set of values of a primary musical parameter, wherein the primary musical parameter is an energy parameter; and determining a second set of values of a secondary musical parameter different than the primary musical parameter, wherein the secondary musical parameter is a musical frequency parameter, wherein each value of the second set of values is different from the remaining values in the second set of values, and wherein each value of the second set of values is associated with a value of the first set of values;

based on the first set of values, the second set of values and a characterization of the user, generating a mapping of the music input to the multidimensional array, wherein generating the mapping comprises:

for each haptic actuator of the plurality of haptic actuators:

based on a respective location of the haptic actuator within the multidimensional array, determining a subset of second values associated with the haptic actuator;

assigning a vibration intensity to the haptic actuator based on a single first value of a subset of first values, wherein the single first value is the maximum first value of the subset of first values, wherein the subset of first values is associated with the subset of second values; and controlling the plurality of haptic actuators to actuate based on the mapping.

12. The method of claim 11, wherein the plurality of haptic actuators are coupled to the user by the wearable garment.

13. The method of claim 12, wherein the wearable garment at least partially encircles a torso of the user.

14. The method of claim 11, wherein generating a mapping of the music input comprises determining a plurality of musical characteristics of the music input, wherein each musical characteristic of the plurality is associated with a different dimension of the multidimensional space.

15. The method of claim 11, wherein receiving the music input comprises sampling an audio signal at a microphone mechanically coupled to the plurality of haptic actuators.

16. The method of claim 11, wherein generating the mapping comprises:

generating a frequency representation of the music input, comprising performing a discrete Fourier transform on the music input;

selecting a first frequency range of the frequency representation;

determining a first power of the first frequency range;

based on a first frequency of the first frequency range, determining a first location within the mapping;

based on the first power, determining a first actuation intensity value associated with the first location;

selecting a second frequency range of the frequency representation, the first frequency range not overlapping the second frequency range, wherein the first frequency is a lower frequency than a second frequency of the second frequency range;

determining a second power of the second frequency range;

based on the second frequency, determining a second location within the mapping, wherein the second location is above the first location; and based on the second power, determining a second actuation intensity value associated with the second location.

17. The method of claim 16, wherein:

for a first haptic actuator of the plurality:
 the corresponding location within the multidimensional space is the first location; and for a second haptic actuator of the plurality:
 the corresponding location within the multidimensional space is the second location; and the first actuation intensity value is greater than the second actuation intensity value.

18. The method of claim 11, wherein generating the mapping of the music input comprises performing a Linear Predictive Coding (LPC) operation, wherein the mapping is further determined based on a set of filter coefficients resulting from the LPC operation and wherein the respective actuation intensity is further determined based on an energy feature resulting from the LPC operation.

* * * * *